US008146511B1

(12) United States Patent
Analetto

(10) Patent No.: US 8,146,511 B1
(45) Date of Patent: Apr. 3, 2012

(54) DOLLY FOR A CONVEYOR OF AN AUTOMATED CAR WASH

(75) Inventor: Anthony Analetto, Weston, FL (US)

(73) Assignee: Sonny's Enterprises Inc., Tamarac, FL (US)

( * ) Notice: Subject to any disclaimer, the term of this patent is extended or adjusted under 35 U.S.C. 154(b) by 0 days.

(21) Appl. No.: 13/006,891

(22) Filed: Jan. 14, 2011

(51) Int. Cl.
*B61B 9/00* (2006.01)
(52) U.S. Cl. .................. 104/172.3; 104/172.1; 104/165
(58) Field of Classification Search ............... 104/172.1, 104/172.3, 162, 165, 164
See application file for complete search history.

(56) References Cited

U.S. PATENT DOCUMENTS

| | | | | |
|---|---|---|---|---|
| 4,864,936 | A * | 9/1989 | Rietsch, Jr. ................. | 104/172.1 |
| 6,647,894 | B1 * | 11/2003 | Simoes ....................... | 104/172.1 |
| 7,243,605 | B1 * | 7/2007 | Belanger et al. ........... | 104/172.1 |
| 7,530,317 | B1 * | 5/2009 | Belanger et al. ........... | 104/172.3 |
| 7,607,395 | B2 * | 10/2009 | Belanger et al. ............. | 104/107 |
| 2003/0200892 | A1 * | 10/2003 | Calisi et al. ................. | 104/172.3 |
| 2008/0229965 | A1 * | 9/2008 | Balash .......................... | 104/162 |
| 2010/0242785 | A1 * | 9/2010 | Turner ........................ | 104/172.3 |
| 2011/0036263 | A1 * | 2/2011 | Balash ......................... | 104/162 |
| 2011/0088585 | A1 * | 4/2011 | Smock et al. ............... | 104/172.3 |

* cited by examiner

*Primary Examiner* — S. Joseph Morano
*Assistant Examiner* — Jason C Smith
(74) *Attorney, Agent, or Firm* — Laurence A. Greenberg; Wener H. Stemer; Ralph E. Locher

(57) ABSTRACT

A dolly contains a main center link having two arms extending from a central portion. A pair of tire engaging rollers and a pair of track engaging rollers are supported on the arms. Bolts are provided and engage in offset bores formed in the arms. A pair of tire stabilizing rollers is supported on the bolts. The tire stabilizing rollers, the track engaging rollers and the tire engaging rollers each have a different effective diameter to a tangent point of tire contact. The effective diameter of the tire stabilizing rollers is greater than the effective diameter of the track engaging rollers. The effective diameter of the tire engaging rollers is greater than the effective diameter of the tire stabilizing rollers. The tire engaging rollers and the tire stabilizing rollers prevent the tire from engaging the tracking engaging rollers during operation of the dolly.

7 Claims, 3 Drawing Sheets

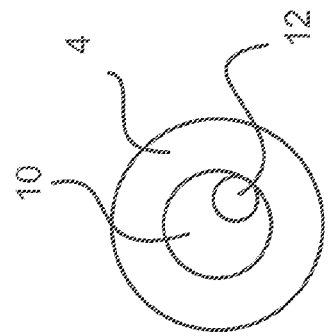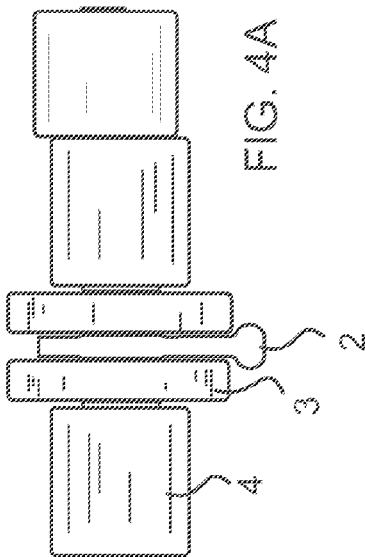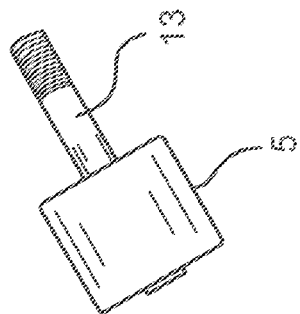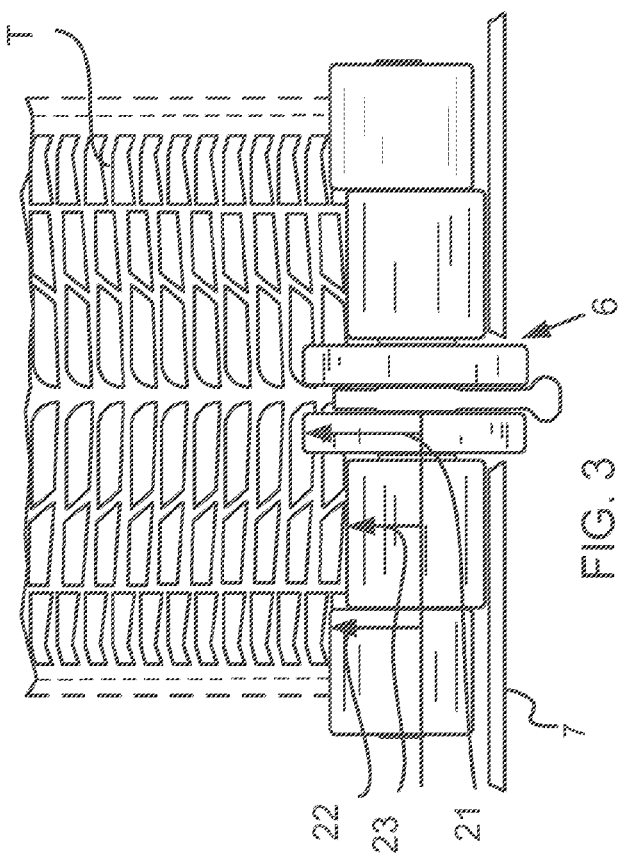

DOLLY FOR A CONVEYOR OF AN AUTOMATED CAR WASH

BACKGROUND OF THE INVENTION

Field of the Invention

The invention relates to dollies for use in a conveyor for an automated carwash.

In automated car washes, it is known to use endless chain conveyors of the type having "dollies" linked into the chain at regular intervals. The dollies are used to push vehicles along the conveyor by engaging a tread surface of a tire. To function properly dollies must have tire engaging rollers and track engaging rollers. Typically the tire engaging rollers are larger in diameter than the track engaging rollers and are disposed in a center slot between opposite longitudinally extending track rails. The dollies are connected into the continuous loop chain by a center link.

U.S. Pat. No. 7,243,605 to Belanger et al. teaches a well known dolly. The dolly is formed of a long steel axle member in the form of a steel bolt having a threaded end which receives a nut. Mounted on the steel bolt is a center link which is adapted to be connected into and form a part of an endless loop chain. The center link has an eccentric or off-center through-hole for receiving the steel bolt. Larger diameter tire engaging rollers are arranged on opposite side of the center link and mounted on the steel bolt. Smaller diameter track engaging rollers are mounted on the steel bolt outboard of the tire engaging rollers for engaging the track rails of a conveyor track. At each of the most outboard positions, a stabilizing roller is arranged on the steel bolt. The entire assembly is being held together by a nut engaging the end of the steel bolt. The tire engaging roller is mounted on a radial bearing which interfits with a shouldered portion of the center link. The radial bearing interfits with bearing members disposed between the tire engaging rollers and the track engaging rollers and also including an off-center through-hole which receives the steel bolt. A set of radial bearings is provided for the track engaging rollers and these bearings coact with thrust bearings which are disposed between the track engaging rollers and the outboard stabilizing rollers. Holes in the bearing members are also off center. Bearing members support the stabilizing rollers and the holes through the bearings are on center as opposed to the off-center holes in the bearing members. As a result of the off-center holes in the elements and the on-center holes in the bearing members, the outboard stabilizing rollers, although they are essentially the same diameter as the track engaging rollers, sit higher when the dolly is disposed on one of the sets of tracks and do not contact the track surfaces. In addition, the stabilizing rollers at least approximate a radius of the tire engaging rollers at a tangent point of contact with tire. The advantage of this arrangement is to prevent the tire of a vehicle being conveyed from engaging and stalling the track engaging rollers if the tire moves off center relative to the tire engaging rollers.

On the one hand, the Bellanger taught dolly uses a single, inexpensive steel bolt for connecting all of the components to each other. On the other hand, the choice of using a single, steel bolt unnecessarily complicated the design and at the same time reduced its robustness by requiring the use of ten further bearings and bearing members for adapting the rollers to the steel bolt.

There is a need for a less complicated, less expensive design and at the same time having a longer service life and greater reliability.

BRIEF SUMMARY OF THE INVENTION

It is accordingly an object of the invention to provide a dolly for a conveyor of an automated carwash that overcomes the above-mentioned disadvantages of the heretofore-known devices of this general type, which is of a less complicated design and has a longer service life.

With the foregoing and other objects in view there is provided, in accordance with the invention a dolly for a conveyor track. The dolly contains a main center link having a central portion and two arms extending from the central portion, the arms each have an offset bore formed therein. A pair of tire engaging rollers is supported on the arms of the main center link, one of the tire engaging rollers is disposed on each side of the central portion. A pair of track engaging rollers is supported on the arms of the main center link, one of the tracking engaging rollers is disposed on each side of the central portion and on an outer side of one of the tire engaging rollers. Bolts are provided, one of the bolts engages in the offset bore in each of the arms. A pair of tire stabilizing rollers is provided and each is supported on one of the bolts. The tire stabilizing rollers, the track engaging rollers and the tire engaging rollers each have a different effective diameter to a tangent point of tire contact. The effective diameter of the tire stabilizing rollers is greater than the effective diameter of the track engaging rollers. The effective diameter of the tire engaging rollers is greater than the effective diameter of the tire stabilizing rollers. The tire engaging rollers and the tire stabilizing rollers prevent the tire from engaging the tracking engaging rollers during operation of the dolly.

In accordance with an added feature of the invention, the effective diameter of the tire engaging rollers is 10-15 mm greater than the effective diameter of the tire stabilizing rollers. Ideally, the effective diameter of the tire engaging rollers is 12 mm greater than the effective diameter of the tire stabilizing rollers.

In accordance with an additional feature of the invention, the arms are welded to the central portion of the main center link. Ideally, the arms and the central portion are a one-piece unit. Because the main center link is a one piece unit, it is robust and provides an easy to assemble mount for the rollers and does not require additional pieces to mount the rollers on the arms of the main center link.

In accordance with a further feature of the invention, the arms define a first axis and the threaded bolts define a second axis running offset from and parallel to the first axis.

In accordance with yet another feature of the invention, the offset bore is a threaded offset bore and the bolt is a threaded bolt and is releasably held in the threaded offset bore. Because the threaded bolt is releasably held, damaged rollers can be quickly replaced and the dolly assembly is easily ship and assembly on-site.

Other features that are considered as characteristic for the invention are set forth in the appended claims.

Although the invention is described herein as embodied in a dolly for a conveyor of an automated carwash, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

BRIEF DESCRIPTION OF THE SEVERAL VIEWS OF THE DRAWING

FIG. 3 is a diagrammatic, front view of the dolly as it engages a tire;

FIG. 4A is a diagrammatic, front view of the dolly with a tire stabilizing roller removed; and FIG. 4B is a diagrammatic, side view of the dolly with the tire stabilizing roller removed.

DETAILED DESCRIPTION OF THE INVENTION

Figure 1:
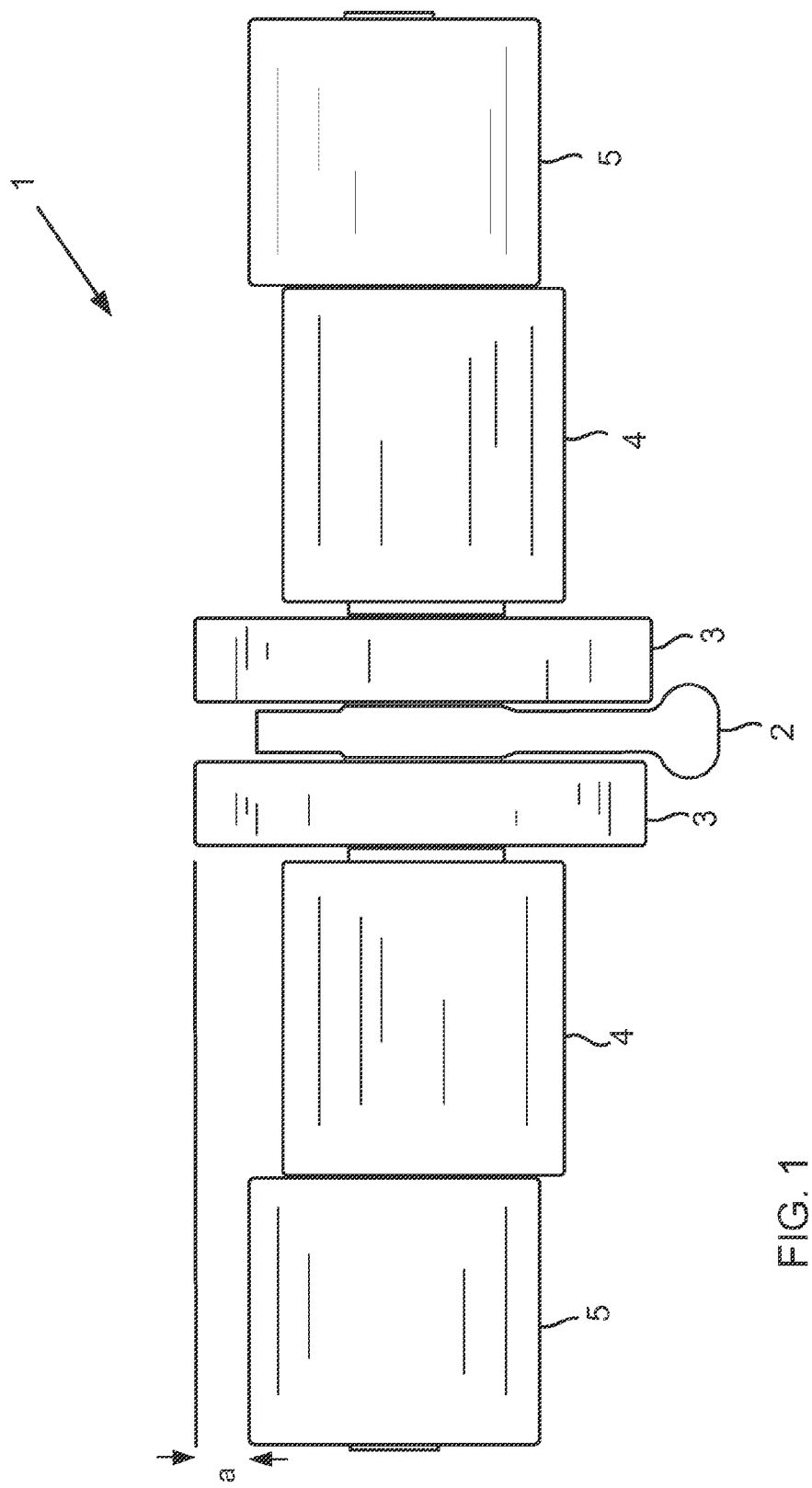
FIG. 1 is a diagrammatic, front view of a dolly according to the invention.

Referring now to the figures of the drawing in detail and first, particularly, to FIG. 1 thereof, there is shown a dolly 1 formed of a main center link 2. The main center link 2 supports a pair of tire engaging rollers 3 disposed on opposite sides of the main center link 2 in a most inner position. Next to the tire engaging rollers 3 are track engaging roller 4 and next to the track engaging rollers 4 are tire stabilizing rollers 5. The tire engaging rollers 3 are provided for engaging tires t of a vehicle entering the carwash and for moving the vehicle through the automated carwash, see FIG. 3. The tire engaging rollers 3 generally fit in a slot 6 of a conveyor track 7 for conveying vehicles through the carwash. The center main link 2 has a main opening 20 for connecting the dolly 1 into the vehicle conveyor 7 (see FIGS. 2 and 3).

The track engaging rollers 4 are provided for engaging the conveyor track and generally roll on track trails of the conveyor track 7. The tire stabilizing rollers 5 are provided for stabilizing the tire should the tire t start to fall off the tire engaging rollers 3, the tire stabilizing rollers 5 engage the tire and prevents it from further sliding off to the tire engaging rollers 3 and interfering with the track engaging rollers 4 rolling along the conveyor track.

The tire engaging rollers 3 have a diameter (e.g. 90-110 mm, ideally 100 mm) being greater than the diameter of either the track engaging rollers 4 or the stabilizing rollers 5 (e.g. 60-80 mm, ideally 72 mm). However, the diameters of the track engaging rollers 4 and the stabilizing rollers 5 are approximately the same (e.g. 60-80 mm).

Figure 2:
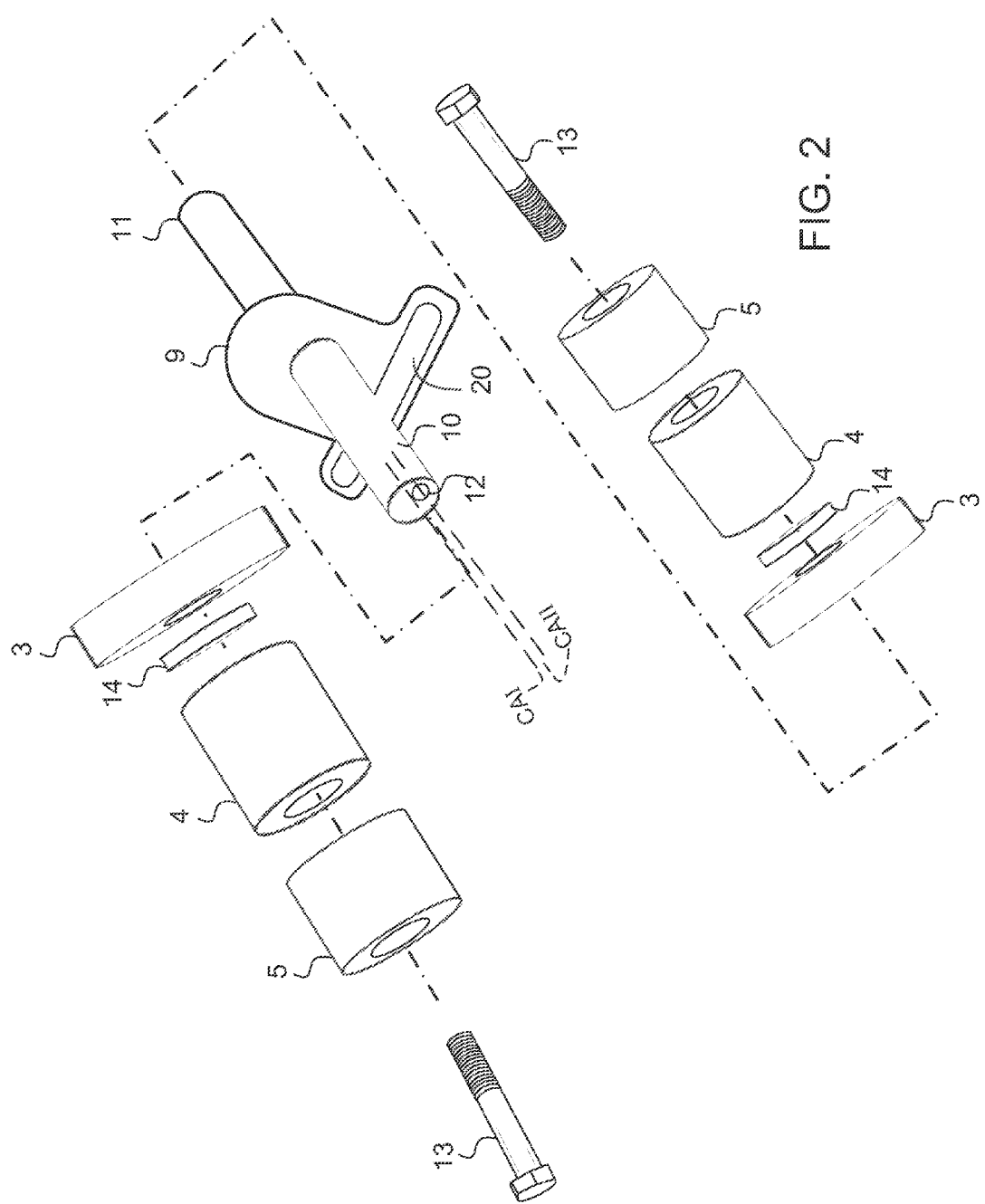
FIG. 2 is a diagrammatic, exploded perspective view of the dolly.

FIG. 2 shows an exploded view of the dolly 1. The main center link 2 is formed with a central portion 9 and two arms 10, 11, a left-side arm 10 and a right-side arm 11. The main center link 2 is preferably manufactured as a single piece unit but costs can be saved by attaching the arms 10, 11 to the central portion 9 by welding or other attaching measures. Each of the ends of each of the arms 10, 11 is threaded with a thread 12 for receiving a threaded bolt 13. The threads 12 are offset with regards to the ends of the arms 10, 11.

The arms 10, 11 support the tire engaging rollers 3, the track engaging rollers 4 and a washer 14 disposed between the tire engaging rollers 3 and the track engaging rollers 4. The threaded bolts 13 support the tire stabilizing rollers 5 and engage in the offset threads 12 and are mounted offset on the arms 10, 11.

As the tire engaging rollers 3 have a larger diameter, they extend radially outwardly greater than either the track engaging rollers 4 or the tire stabilizing rollers 5 and ideally solely engage the tire t of a vehicle. On the one hand, the tire stabilizing roller 5 extends above the track engaging roller 4 and the guide track of the vehicle conveyor 7, on the other hand the tire stabilizing roller 5 extends below the tire engaging roller 3 by a given distance "a" (FIG. 1). The distance "a" is in the range of 10-15 mm and ideally is approximately 12 mm. Although the track engaging roller 4 and the tire stabilizing roller 5 have the same diameter, the tire stabilizing roller 5 is supported on the arm 10, 11 offset in relation to the track engaging roller 4. Therefore, if a tire t were to start to slip off of the tire engaging roller 3, it would strike the tire stabilizing roller 5 and therefore would not interfere with the operation of the tracking engaging roller 4 so that it may continue to roll along the track rail of the vehicle conveyor 7 uninhibited by the tire t.

As shown in FIG. 3, an effective diameter 21 of the tire engaging rollers 3 to the tangent point of tire contact is greater than an effective diameter 22 of the tire stabilizing rollers 5. In turn, because of the offset, the effective diameter 22 of the tire stabilizing rollers 5 is greater than an effective diameter 23 of the track engaging rollers 4.

As can be ascertained from FIG. 2, the dolly 1 can be easily and quickly assembled as there are few component parts and the parts are self aligning due to the arms 10, 11 of the center main link 2. This leads to an inexpensive and robust configuration of the dolly.

FIG. 4A is a front view of the dolly with one of the tire stabilizing rollers 5 removed from the threads 12 of the main center link 2. In this manner the tire stabilizing rollers 5 are releasably attached to the arms 10, 11 by the threaded bolts 13. FIG. 4B shows that the threads 12 are clearly offset on the arms 10, 11 of the main center link 2. Therefore, the main center link 2 defines two axes. A first axis CAI is defined by the arms 10, 11 and a second center axis CAII is defined by the offset threads 12 (see FIG. 2).

Preferably, the center main link 2 and the arms 10, 11 are made from a metallic material which provides robustness to the design. In contrast, the roller 3, 4 and 5 are made from a hard plastic material so as to be adequate for engaging vehicles tires and for rolling along the conveyor tracks without damaging either the tires or the conveyor tracks.

The invention claimed is:

1. A dolly for a conveyor track, the dolly comprising:
a main center link having a central portion and two arms extending from said central portion, said arms each having an offset bore formed therein;
a pair of tire engaging rollers supported on said arms of said main center link, one of said tire engaging rollers disposed on each side of said central portion;
a pair of track engaging rollers supported on said arms of said main center link, one of said tracking engaging rollers disposed on each side of said central portion and on an outer side of one of said tire engaging rollers;
bolts, one of said bolts engaging in said offset bore in each of said arms;
a pair of tire stabilizing rollers each supported on one of said bolts; and
said tire stabilizing rollers, said track engaging rollers and said tire engaging rollers each having a different effective diameter to a tangent point of tire contact, said effective diameter of said tire stabilizing rollers being greater than said effective diameter of said track engaging rollers, said effective diameter of said tire engaging rollers being greater than said effective diameter of said tire stabilizing rollers, said tire engaging rollers and said tire stabilizing rollers preventing the tire from engaging said tracking engaging rollers during operation of the dolly.

2. The dolly according to claim 1, wherein said effective diameter of said tire engaging rollers is 10-15 mm greater than said effective diameter of said tire stabilizing rollers.

3. The dolly according to claim 1, wherein said effective diameter of said tire engaging rollers is 12 mm greater than said effective diameter of said tire stabilizing rollers.

4. The dolly according to claim 1, wherein said arms are welded to said central portion.

5. The dolly according to claim 1, wherein said arms and said central portion are a one-piece unit.

6. The dolly according to claim 1, wherein said arms define a first axis and said threaded bolts define a second axis running offset from and parallel to said first axis.

7. The dolly according to claim 1, wherein:
said offset bore is a threaded offset bore; and
said bolt is a threaded bolt and is releasably held in said threaded offset bore.

* * * * *